United States Patent [19]

Linden

[11] 3,983,759

[45] Oct. 5, 1976

[54] DOUBLE-ACTING WRENCH

[76] Inventor: Craig L. Linden, 1335 Midway Drive, Alpine, Calif. 92001

[22] Filed: Sept. 2, 1975

[21] Appl. No.: 609,192

[52] U.S. Cl. ........................................ 74/88; 74/404; 81/57.3

[51] Int. Cl.² ................... F16H 27/02; F16H 29/02; F16H 57/00; B25B 17/00

[58] Field of Search ...................... 74/88 A, 25, 404; 81/57.3 X

[56] References Cited

UNITED STATES PATENTS

| | | | |
|---|---|---|---|
| 1,762,063 | 6/1930 | Knight | 74/88 X |
| 2,478,894 | 8/1949 | Carlsten | 74/88 X |
| 2,590,706 | 3/1952 | Isaac | 81/57.3 X |
| 2,680,983 | 6/1954 | Miller | 81/57.3 |
| 3,463,038 | 8/1969 | Scull | 81/57.3 |
| 3,590,645 | 7/1971 | Magri et al. | 74/88 |
| 3,828,629 | 8/1974 | Moore | 81/57.3 |

*Primary Examiner*—Leonard H. Gerin
*Attorney, Agent, or Firm*—Clement H. Allen

[57] ABSTRACT

A double-acting wrench has a main handle and a holding handle, the end of the main handle being connected to a set of reversing gears, and through a ratchet and double pawls to the cage in which the set of reversing gears are mounted. The reversing gears, or the cage in which they are mounted, are selectively connected to a tool driver. Ratchets and double pawls are engageable so that rotation of the main handle in either clockwise or counterclockwise direction with respect to the holding handle will produce continuous clockwise or counterclockwise rotation of the tool driver.

8 Claims, 7 Drawing Figures

DOUBLE-ACTING WRENCH

BACKGROUND OF THE INVENTION

1. The Field of the Invention

This invention relates to a wrench of the ratchet type adapted to drive or turn a socket or blade with clockwise and counterclockwise rotation of a handle.

2. The Prior Art

A number of ratchet-type wrenches have been proposed and used. These may be of the simple ratchet type in which a clockwise and counterclockwise rotation of a handle in relatively short repetitive sequence will drive a socket or blade in one direction. At each forward stroke of the handle the tool driver is rotated, but on the reverse stroke a pawl rides over a ratchet or toothed wheel and allows relocation of the handle for another forward stroke. Such wrenches are useful, particularly when the available space for handle movement is small; and rotation of the tool driver, to which may be attached a socket or screwdriver blade, is accomplished by a number of strokes of limited arc length. A serious limitation is, however, that such ratchet wrenches provide turning power to the tool driver only during a stroke in one direction, that is the rotation is not continuous. The return stroke is wasted as far as power application is concerned and serves only to relocate the pawls or dogs and the handle for another power stroke.

Additionally, wrenches have been designed which are geared to provide an increased torque to the tool driver so that its socket or blade may be rotated with increased power. Such wrenches may be provided with more than one set of gears so that the torque ratio may be varied. However, these wrenches, like the simple ratchet wrench described above, drive on a stroke of the handle in one direction only.

A wrench designed to apply turning force to its driver continuously in one direction on both clockwise and counterclockwise strokes of its handle would be advantageous in that it would substantially double the overall speed of socket or blade rotation.

SUMMARY OF THE INVENTION

A double-acting wrench for rotating a tool driver in a selected clockwise or counterclockwise continuous direction during both clockwise and counterclockwise rotation of a handle comprises a holding handle and a main handle, each having an end rotatably mounted on a common shaft. A set of reversing gears is mounted in a cage which is fixedly attached to the shaft, and a tool driver, for example of conventionally square cross section, is rotatably attached to an end of the shaft. Pawls and ratchets are arranged to selectively connect the main handle through the gear case with the reversing gears locked in the gear case to the tool driver when the main handle is rotated in one direction with respect to the holding handle, either clockwise or counterclockwise; and through the set of reversing gears rotatably operable in the gear cage to the tool driver when the main handle is rotated in the other direction, either clockwise or counterclockwise, with respect to the holding handle. The pawls and ratchet may be positioned or locked so that the tool driver rotates in one continuous direction, either clockwise or counterclockwise, when the main handle is rotated in either direction with respect to the holding handle. A release is provided to convert the wrench to a normal or single-action ratchet type.

DESCRIPTION OF A PREFERRED EMBODIMENT

Figure 1:
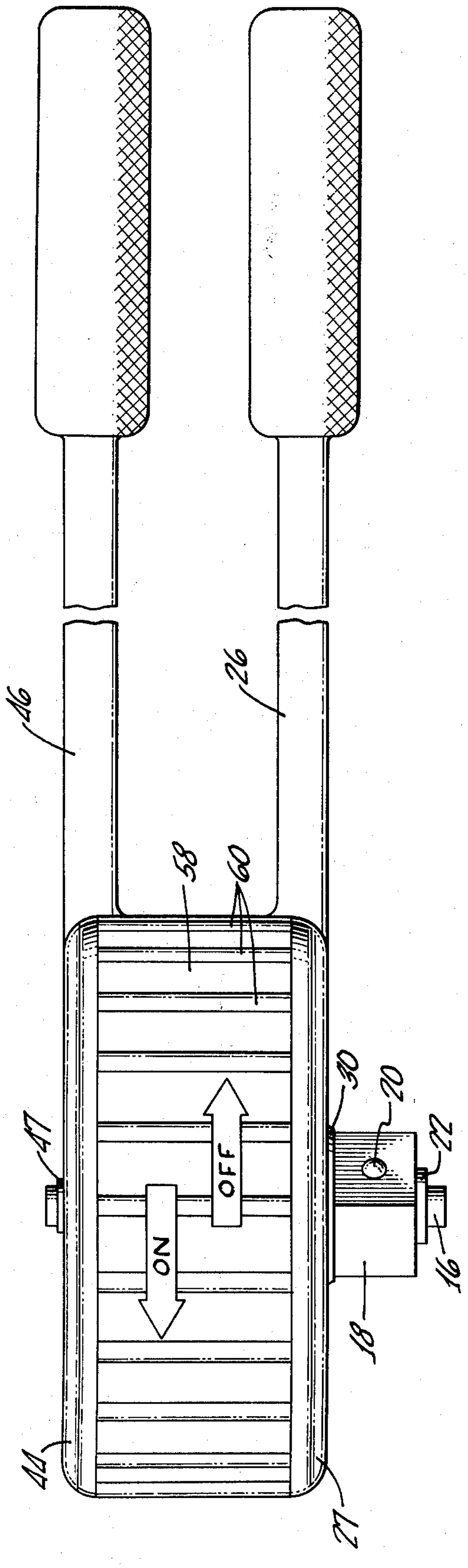
FIG. 1 shows a general side view of a wrench embodying features of this invention.
Figure 2:
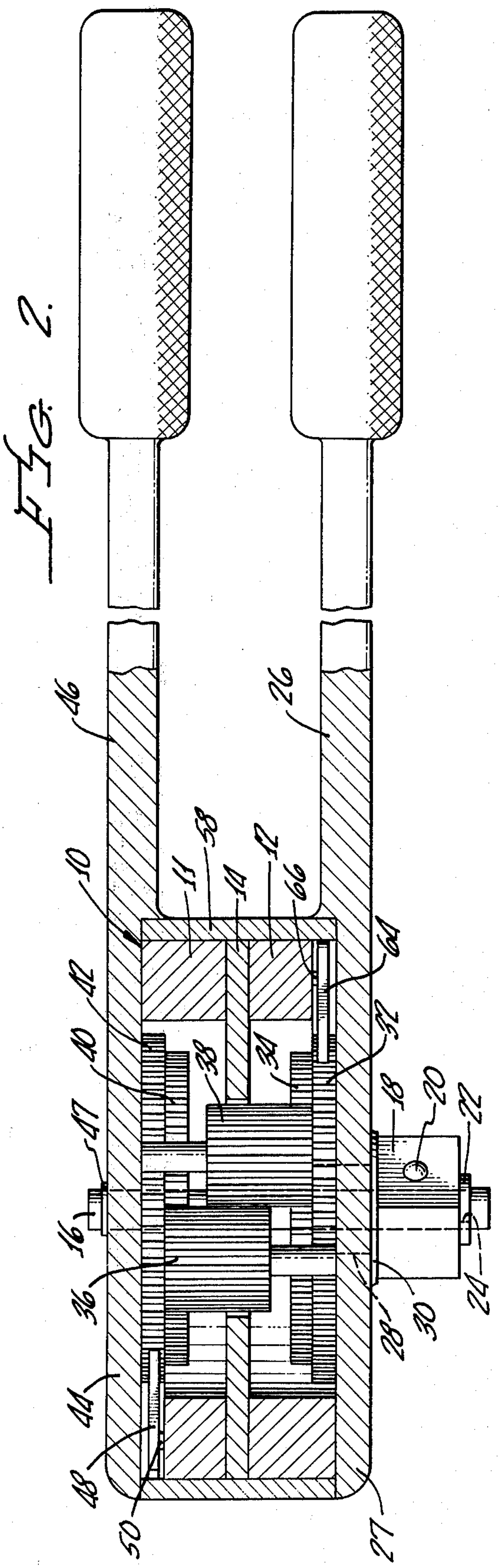
FIG. 2 shows a side view of the wrench of FIG. 1 but with the gear case broken out to show the gear and pawl arrangements.
Figure 3:
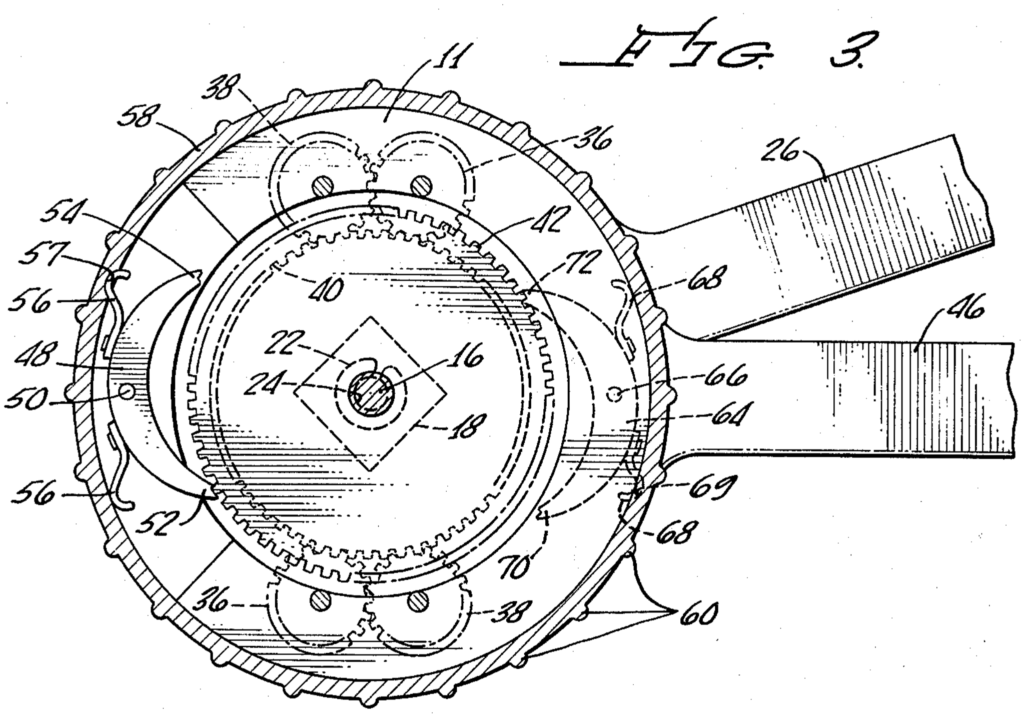
FIG. 3 shows an enlarged top view of the wrench of FIG. 1 with the gear case broken out.

Referring now particularly to FIGS. 1 to 3, the wrench comprises a central gear cage 10 formed of an upper ring 11 and a lower ring 12 joined across their central parts by plate 14. Passing through plate 14 and fixedly attached thereto is a vertical shaft 16 having rotatably mounted thereon a square cross section tool driver 18 having a spring catch or ball 20 for conventional attachment to a socket or other tool for turning a nut or bolt, for example. Tool driver 18 is maintained on the bottom end of shaft 16 by spring washer 22 seated in groove 24.

Figure 4:
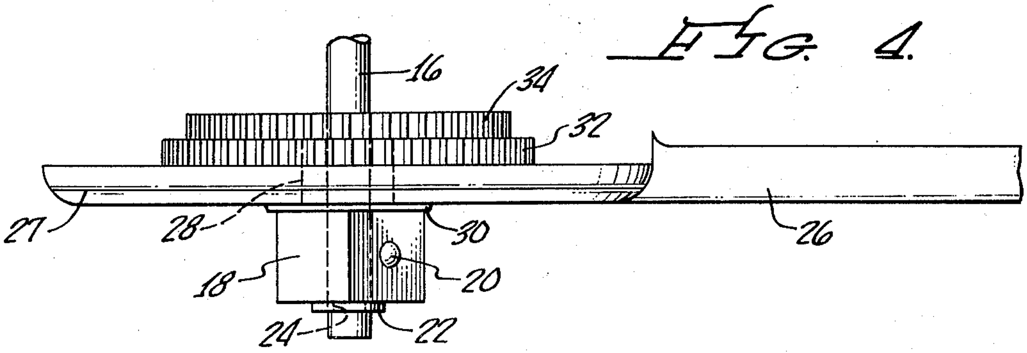
FIG. 4 shows a separate detail view of the holding handle and its adjacent gears.

Holding handle 26 has a circular end 27 which is rotatably mounted on a circular extension 28 of tool driver 18 as will be more clearly seen in FIG. 4. Thus holding handle 26 is freely rotatable about extension 28 of tool driver 18 and the lower part of shaft 16, being held in position by extending flange 30 on tool driver 18. A lower ratchet gear 32 is fixedly attached to an inner part of circular end 27 of holding handle 26 and above it, and fixedly attached to the top of circular extension 28 of tool driver 18 is spur 34 which is the lower or output gear of the set of reversing gears housed in gear cage 10.

Figure 5:
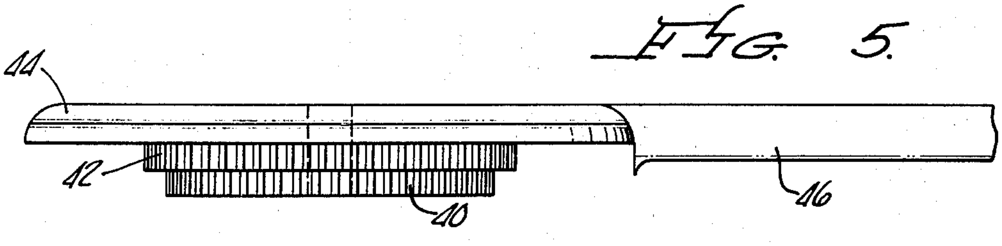
FIG. 5 shows a separate detail view of the main handle and its adjacent gears.

As seen in the broken out areas of FIGS. 2 and 3 two pairs of intermeshing pinion gears 36 and 38 are arranged on shafts rotatably mounted in and between upper gear cage ring 11 and lower ring 12 and situated in cut out areas of plate 14. Pinion gears 36 are provided with teeth over their top and central areas, while pinion gears 38 are provided with teeth over their bottom and central areas. The central areas of pinion gears 36 and 38 mesh with each other. The bottom toothed areas of gears 38 mesh with bottom spur gear 34 fixedly attached to square driver 18 through its extension 28, and the top toothed areas of pinion gears 36 mesh with an upper or input spur gear 40 which is also rotatable around shaft 16 and to which is fixedly attached concentric upper ratchet gear 42 which in turn is fixedly attached to the circular end 44 of main, or other, handle 46 as seen in FIG. 5. Main handle 46 is rotatable about shaft 16 being held in position thereon by spring washer 47 seated in a conventional groove encircling shaft 16.

It will be seen that spur gears 34 and 40 together with intermeshing pinion gears 36 and 38 can comprise a set of reversing gears. Tool driver 18 is fixedly attached to one of this set of gears; in the embodiment illustrated its attachment is to output gear 34.

Double-ended pawl 48 is pivotably attached, as by pin 50, to the top of gear cage upper ring 11, and is provided with end catch 52 to selectively engage the teeth of upper ratchet gear 42 when main handle 46 is rotated in one direction, and to pass freely over the teeth of ratchet gear 42 when handle 46 is rotated in the other direction. Pawl 48 is also provided at its other end with catch 54 to selectively engage the teeth of ratchet gear 42 when handle 46 is rotated in the said other direction and to pass freely over the teeth of ratchet gear 42 when main handle 46 is rotated in the first mentioned direction. Selection of the catches for engagement is accomplished by spring detents 56 which are fixedly mounted on the outer surface of pawl 48, one on each side of pin 50. One of detents 56 will engage a notch 57 in the inner surface of rotatable outer gear case 58 and thereby allow its attached end of pawl 48 to be released from ratchet gear 42, the other end of pawl 48 being biased into engagement with ratchet gear 42 by the other detent 56 bearing against an un-notched area of the surface of outer gear case 58. As illustrated in FIG. 3, notch 57 is set by manual rotation of gear case 58 so as to engage detent 56 located on the end of pawl 48 having catch 54 which is thereby entirely released from ratchet gear 42 while catch 52 at the other end of pawl 48 is maintained in engagement with ratchet gear 42 when this is rotated clockwise, and will ride freely over the teeth of ratchet gear 42 when this is rotated counterclockwise. To selectively reverse the action of catches 52 and 54, outer gear case 58 is appropriately rotated to place notch 57 in engagement with detent 56 on the end of pawl 48 fitted with catch 52 so that this catch will be released from engagement with ratchet gear 42, and catch 54 will engage the teeth of ratchet gear 42 when this is rotated in counterclockwise direction. The outer surface of outer gear case 58 may be provided with ribs or ridges 60 so that it may be readily manually turned or rotated, even with greasy or slippery fingers.

Pivotably attached to the bottom or underside of gear cage lower ring 12 is another double pawl 64 mounted as by pin 66 in a manner similar to that of pawl 48 mounted on ring 11. Spring detents 68 are similarly mounted on the outer surface pawl 64 to selectively engage a notch 69 in the inner surface of gear case 58. With detent 68 on the end of pawl 64 having end catch 70 engaged with notch 69 as shown, catch 72 on the other end of pawl 64 will engage the teeth of ratchet gear 32, as shown, when this is rotated in clockwise direction. When outer gear case 58 is rotated to place notch 69 over detent 68 at the end of pawl 64 having end catch 72, then this catch will be released from ratchet gear 32 and end catch 70 will engage the teeth of ratchet gear 32 when this is rotated counterclockwise. Detents 56 and 68 together with notches 57 and 69 will be seen to comprise means for locking the position of pawls 48 and 64 with respect to ratchet gears 42 and 32 to obtain desired tool driver 18 rotation in either clockwise or counterclockwise direction.

It will be understood that terms such as "upper" and "lower" and "clockwise" and "counterclockwise" are employed for clarity in describing the embodiment illustrated in the drawings and are relative for the orientation shown. However the wrench may be employed in any useful position; on end or side as shown, or inverted, without affecting its usefulness or the inter-action of its component parts.

Figure 6:
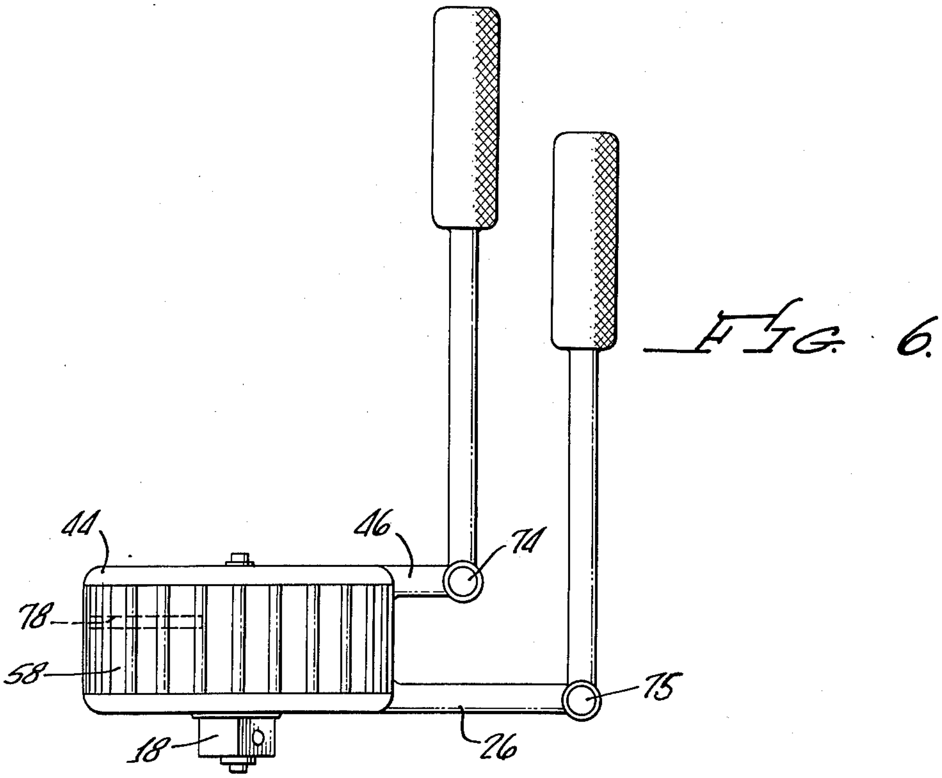
FIG. 6 shows a side view of a modified form of the wrench of FIG. 1 in which the handles are hinged.

In FIG. 6 is shown a modification of the wrench in which the arms of handles 46 and 26 are hinged horizontally as at 74 and 75 respectively so that one or both of these handles may be folded or bent in order to be more readily operable in confined spaces.

In operation, a suitable socket, or other tool is placed on the square shaft of tool driver 18 where it will be held in place by spring ball 20. Then the socket or tool is engaged with the nut or other device to be driven or turned. Outer gear case 58 is rotated until the desired detent 56 at the proper end of pawl 48 engages notch 57 to cause rotation of driver 18 in the "ON" or "OFF" direction, corresponding to clockwise or counterclockwise when driving a nut, for example, on or off a right hand threaded bolt. Main handle 46 is then rotated in a short and convenient arc clockwise or counterclockwise with respect to holding handle 26 which may be held stationary. At the end of its movement, the direction of rotation of handle 46 (with respect to handle 26) is reversed and it is returned with a counter-direction rotation. Movement of handle 46 repetitively or sequentially in one direction and then in the other with respect to handle 26 will result in rotation of tool driver 18 and its attached socket and nut or other device without pause in one continuous direction. The direction in which tool driver 18 will be rotated will depend on the setting of outer gear case 58 and the location of notches 57 and 69 with respect to detents 56 and 68 which control the action of double pawls 48 and 64. Thus a uni-directional motion, without pause for a recovery stroke, is imparted to tool driver 18 when main handle 46 is moved repetively in one direction and then the other, with respect to holding handle 26.

To follow the inter-action of the various parts and gears, assume that the outer case 58 is set as shown in FIG. 3 for clockwise rotation of the tool driver 18. An initial clockwise rotation of handle 46 with respect to handle 26 will result in catch 52 of pawl 48 engaging the teeth of ratchet gear 42 and thus locking the entire gear cage assembly with spur gear 34 which locks the reversing gears and rotates the tool driver 18 also in a clockwise direction. Then a counterclockwise movement of handle 46 with respect to handle 26 causes rotation of ratchet gear 42 and spur gear 40 with respect to the gear case assembly thus driving pinion gears 36 and 38 and finally rotating spur gear 34 in a clockwise direction. These gears are rotatably operable in the gear cage when handle 46 is rotated in this direction because the gear cage is prevented from rotating by catch 72 of pawl 64 engaging the teeth of ratchet gear 32, the gear cage assembly under these conditions being locked to the other handle, that is handle 26. Meanwhile catch 52 of pawl 48 simply rides over the teeth of ratchet gear 42. Since spur gear 34 is attached to tool driver 18, this is rotated clockwise. A clockwise rotation of tool driver 18 is thereby provided when handle 46 is rotated in both counterclockwise, as well as clockwise directions.

For counterclockwise rotation of tool driver 18, the outer gear case 58 is rotated counterclockwise from the position of FIG. 3 to cause notches 57 and 69 to engage the other of detents 56 and 68 on pawls 48 and 64 so as to locate catches 54 and 70 for engagement with ratchet gears 42 and 32 respectively. An initial rotation of handle 46 in counterclockwise direction with respect to handle 26 will cause engagement of catch 54 of pawl 48 with the teeth of ratchet gear 42 to lock the entire gear cage with spur gear 34 and tool driver 18 to cause its counterclockwise rotation, while catch 72 of pawl 64 simply rides over the teeth of ratchet gear 32. Clockwise rotation of handle 46 with respect to handle 26 will cause spur gear 40 to rotate clockwise while catch 70 of pawl 64 engages the teeth of ratchet gear 32 to effectively lock the gear cage to handle 26, and catch 54 of pawl 48 simply rides over the teeth of ratchet gear 42. Clockwise rotation of spur gear 40 working through intermediate pinions 36 and 38 results in counterclockwise rotation of spur gear 34 and also of tool driver 18. Therefore with this case setting tool driver 18 is rotated counterclockwise when handle 46 is rotated in both clockwise as well as counterclockwise directions.

Figure 7:
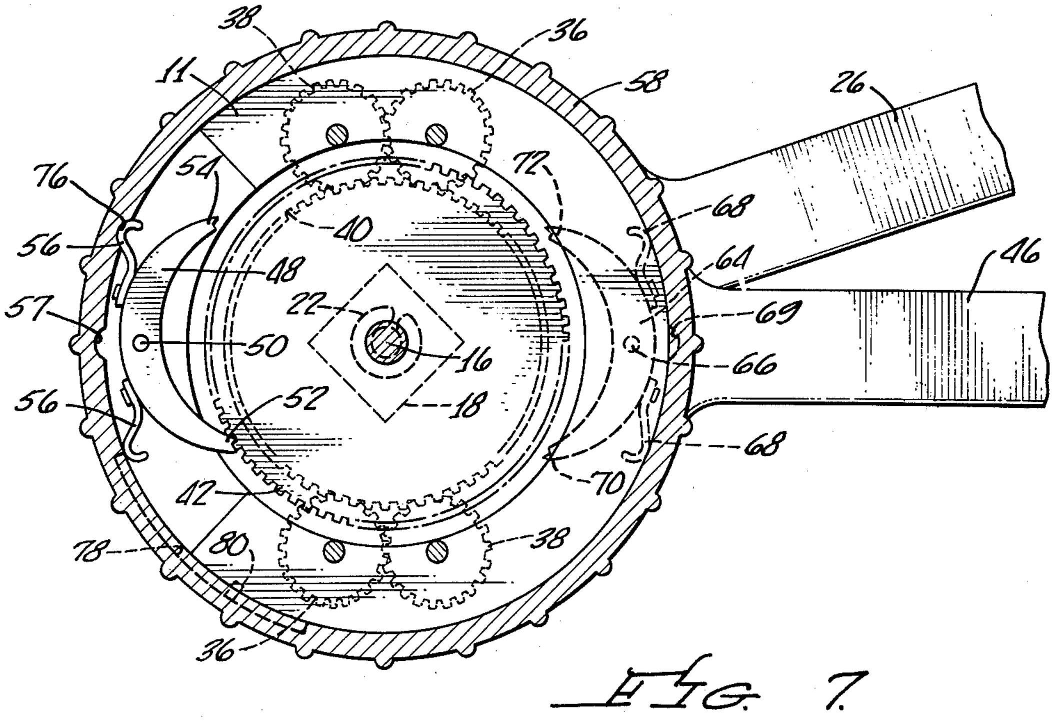
FIG. 7 shows a top view, comparable to that of FIG. 3, showing the release notch for conversion of the wrench operation to single-action.

In FIG. 7 is shown a modification of the wrench of this invention in which an additional notch 76 is provided in outer gear case 58 and is shown engaged with detent 56 at the end of pawl 48 terminating in catch 54. Catch 52 at the other end of pawl 48 is thereby caused to engage ratchet gear 42 while catch 54 is released or held spaced apart therefrom. Additional notch 76 provides ratchet action between pawl 48 and ratchet gear 42 so that tool driver 18 will be rotated in a clockwise direction by clockwise rotation of handle 46. However notch 76 is spaced apart from notch 57 which, when engaged with a detent 56, will cause a corresponding engagement of a detent 68 with outer gear case notch 69 and which thus controls ratchet action between pawl 64 and ratchet gear 32 attached to handle 26. Under the conditions as shown in FIG. 7, with a detent 56 engaging notch 76, neither of detents 68 are engaged with notch 69 and pawl 64 is maintained in neutral or released position so that neither catch 70 nor 72 can engage ratchet gear 32. Handle 26 is thereby released and clockwise and counterclockwise rotation of handle 46 will produce a single-action or normal ratchet clockwise rotation of tool driver 18. Tool driver 18 will stop during the recovery of counterclockwise rotation stroke of handle 46. During rotation of handle 46, handle 26 may be held and rotated together with handle 46, or it may be released or let go.

When outer gear case 58 is rotated clockwise from the position shown in FIG. 7, so that detent 56 on the catch 54 end of pawl 48 engages notch 57, clockwise rotation of tool driver 18 will result with double-action as previously described. If outer gear case 58 is rotated counterclockwise from the position of FIG. 7 so that detent 56 on the catch 52 end of pawl 48 engages notch 57 then catch 52 will be released from engagement from ratchet gear 42 and catch 54 will be engaged therewith, and doubleaction rotation of tool driver 18 in a counterclockwise direction will result, also as previously described. If outer gear case 58 is rotated a further distance counterclockwise, then detent 56 on the catch 52 end of pawl 48 will engage notch 76 in outer gear case 58 while catch 54 will still be engaged with ratchet gear 42 to provide counterclockwise rotation of tool driver 18. But, with the detent 56 on catch 52 end of pawl 48 in notch 76, then notch 69 will be located so that it engages neither of detents 68 on pawl 64, it will be located counterclockwise, in the drawing, of detent 68 on the catch 72 end of pawl 64. Under these conditions, single-action rotation of tool driver 18 will be obtained in a counterclockwise direction.

Due to the asymmetric arrangement of notches 57, 76, and 69 on opposite sides of outer gear case 58 in the embodiment of FIG. 7, it will be advantageous to provide a limitation to the extent of the adjustment travel between outer gear case 58 and gear cage 10. This may be accomplished by provision of an elongated groove 78 around the interior surface of outer gear case 58 and in which rides pin 80 fixedly attached as by threading into the outer edge of upper gear cage ring 11. The vertical location of groove 78 is illustrated in FIG. 6. Groove 78 has right angled ends as shown, and is of length to limit travel of gear cage 10 (with respect to outer gear case 58) a distance only slightly more than required to place either of detents 56 on pawl 48 in both outer gear case notches 57 and 76.

It will be appreciated by those skilled in the art that other types of gear trains which will provide equivalent directional rotation may be employed in the double-acting wrench of this invention instead of the particular spur and pinion gear combination described hereinabove. For example, a planetary type of gear transmission may be used with planet gears rotating in a lockable cage to provide straight through or reverse rotation of the tool driver. However, I prefer the spur gear and pinion gear combination described and illustrated because this can readily be arranged to produce a 1 to 1 gear ratio in either direct or reverse rotation direction. This is obtained when the number of teeth in spur gear 34 is the same as in spur gear 40 and the number of teeth in each of pinions 36 is the same as in pinions 38.

While other means may be provided for selectively locking selected end catches of pawls 48 and 64 in position to engage teeth of ratchet 42 and 32, I prefer the arrangement of detents shown which release selected ends of pawls 46 and 64 by engagement notches or grooves in the inner surface of rotatable outer gear case 58. With this arrangement the gear case may be manually rotated in the direction of desired rotation of the tool driver 18 to place the selected ends of pawls 46 and 64 for engagement of their respective catches with ratchet gears 42 and 32 to produce the same ultimate rotation direction of tool driver 18. Thus to produce an ON or clockwise rotation of a right hand threaded bolt or nut to be driven by driver 18, gear case 58 is rotated in the same clockwise direction to the position shown in FIG. 3. To reverse the direction, gear case 58 is turned in a counterclockwise direction which is the same direction as the OFF direction, until notches 57 and 69 engage detents on the other ends of pawls 48 and 64.

The term "continuous" is applied to the rotation of the tool driver of this invention in the sense that the tool is rotated in one direction without a stop or pause during a recovery stroke of the wrench handle. The reverse direction or recovery stroke continues the rotation of the tool driver in the same original direction. The driver rotation is in a continuous selected direction of rotation with any motion of main handle 46 with respect to holding handle 26.

It will be seen that the operating mechanism of the double-acting wrench of this invention can be considered as apparatus useful for rotating a driven member (tool driver 18) in a selected continuous direction by repetitive and sequential clockwise and counterclockwise rotation of a driving arm (main handle 46) with respect to a stationary member (holding handle 26). Thus a reciprocal, or back and forth, or up and down rotation of the driving arm can be translated into efficient uni-directional rotation of the driven member for a variety of purposes such as conversion of wave motion to usable energy, with power translation being effected during strokes of a driving arm in both directions.

The double-action wrench of this invention is useful for providing twice the tool driver rotation during back and forth stroking of the main handle, compared to a normal or single-action type of ratchet wrench. This substantially doubles the speed of work accomplishment. The arrangement of spur gears in the reversing gear assembly is advantageous for providing a 1 to 1 rotation ratio of handle to tool driver, for example, a quarter turn of main handle 46 with respect to holding handle 26 will impart a quarter turn of tool driver 18. The engagement of detents 56 and 68 with notches 57 and 69 (and 76 in the single-action modification) provides an advantageous positioning that can be felt, during manual rotation of outer gear case 58, when a detent "clicks" into its proper notch. Manual rotation of outer gear case 58 in the direction desired for tool driver rotation, for proper detent and notch engagement, is advantageous for providing clockwise or counterclockwise rotation of the tool driver without visual reference to the outer gear case. Additionally, a release may be provided to convert the mechanism to single, or normal ratchet action should this be necessary or desirable, perhaps due to space limitation or necessity for single-handed operation.

I claim:

1. A wrench for rotating a tool driver in a continuous selected clockwise or counterclockwise direction by clockwise and counterclockwise rotation of a handle which comprises:

a. a main handle and a holding handle, each having an end rotatably mounted on a common shaft;

b. a set of reversing gears mounted in a gear cage fixedly attached to said shaft;

c. said main handle being fixedly attached to the input gear of said set of reversing gears;

d. a tool driver fixedly attached to the output gear of said set of reversing gears;

e. pawl and ratchet means for selectively connecting said main handle through said gear cage with said set of reversing gears locked in said gear cage, to said tool driver when said main handle is rotated in one of clockwise and counterclockwise directions with respect to said holding handle, and through said set of reversing gears rotatably operable in said gear cage, when said main handle is rotated in the other of clockwise and counterclockwise directions with respect to said holding handle; and f. means for selectively locking said pawl and ratchet means in position for rotating said tool driver in one of continuous clockwise and counterclockwise directions during clockwise and counterclockwise rotation of said main handle with respect to said holding handle.

2. A wrench according to claim 1 in which said pawl and ratchet means comprise a pair of double-ended pawls pivotably attached to said gear cage, one of said double-ended pawls being selectively engageable with a ratchet gear fixedly attached to said main handle, and the other of said double-ended pawls being selectively engageable with a ratchet gear fixedly attached to said holding handle.

3. A wrench according to claim 2 in which said means for locking said pawl and ratchet means in position for rotating said tool driver in one of continuous clockwise and counterclockwise directions comprises spring detents attached to each of said double-ended pawls at ends of said pawls remote from the pivotable attachment of pawls to said gear cage, one of said detents attached to each of said pawls engaging a notch in the inner surface of a rotatable outer gear case surrounding said gear cage, the other of said detents attached to each of said pawls biasing its end of said pawl into engagement with said ratchet gear attached to an end of one of said handles.

4. A wrench according to claim 3 in which said outer gear case is manually rotatable to locate said notches in its inner surface to engage selectively one of said detents attached to each of said pawls.

5. A wrench according to claim 4 in which said notch in the inner surface of said gear case when engaged with a detent on a double pawl to provide clockwise rotation of said tool driver is positioned in a location spaced clockwise from the detent on said same double pawl providing counterclockwise rotation of said tool driver, whereby said gear case is rotated, for selection of said detent engaging said notch, in the same direction as it is desired to rotate said tool driver.

6. A wrench according to claim 4 in which an additional notch is provided in said outer gear case to engage a detent attached to the pawl engageable with the said ratchet gear attached to said main handle, while said notch in said outer gear case engageable with a detent on the pawl engageable with the ratchet gear attached to said holding handle is maintained disengaged from said pawl detents, to permit single-action rotation of said wrench.

7. A wrench according to claim 1 in which at least one of said handles has a hinged arm.

8. Apparatus for rotating a driven member in a continuous selected clockwise or counterclockwise direction by repetitive and sequential clockwise and counterclockwise rotation of a driving arm with respect to a stationary member, which comprises:

a. said driving arm and said stationary member each being rotatably mounted on a common shaft;

b. a set of reversing gears mounted in a gear cage fixedly attached to said shaft;

c. said driving arm being fixedly attached to the input gear of said set of reversing gears;

d. a driven member fixedly attached to the output gear of said set of reversing gears; and, e. pawl and ratchet means for selectively connecting said driving arm through said gear cage with said set of reversing gears locked in said gear cage, to said driven member when said driving arm is rotated in one of clockwise and counterclockwise directions with respect to said stationary member, and through said set of reversing gears rotatably operable in said gear cage, when said driving member is rotated in the other of clockwise and counterclockwise directions with respect to said stationary member.

* * * * *